United States Patent [19]

Crowder et al.

[11] Patent Number: 5,442,639
[45] Date of Patent: Aug. 15, 1995

[54] METHOD AND APPARATUS FOR MONITORING A COMMUNICATIONS NETWORK

[75] Inventors: Robert S. Crowder, Newark, Del.; George E. Binder, Elkton, Md.

[73] Assignee: Ship Star Associates, Inc., Newark, Del.

[21] Appl. No.: 135,330

[22] Filed: Oct. 12, 1993

[51] Int. Cl.$^6$ ............................................. G06F 11/00
[52] U.S. Cl. .................................. 371/20.1; 395/280
[58] Field of Search ................. 395/575; 371/32, 20.1, 371/11.2, 29.5

[56] References Cited

U.S. PATENT DOCUMENTS

| | | | |
|---|---|---|---|
| 4,625,332 | 11/1986 | Singer et al. | 371/20.1 |
| 4,628,511 | 12/1986 | Stitzlein et al. | 371/22 |
| 4,947,317 | 8/1990 | Di Giulio et al. | 369/200 |
| 5,007,054 | 4/1991 | Lee et al. | 371/32 |
| 5,109,384 | 4/1992 | Tseung | 371/32 |
| 5,134,574 | 7/1992 | Beaverstock et al. | 364/551.01 |
| 5,136,580 | 8/1992 | Videloch et al. | 370/60 |
| 5,233,628 | 8/1993 | Rappaport et al. | 375/10 |
| 5,251,203 | 10/1993 | Thompson | 370/13.1 |
| 5,272,446 | 12/1993 | Chalmers et al. | 329/304 |
| 5,280,477 | 1/1994 | Trapp | 370/85.1 |
| 5,335,339 | 8/1994 | Maejima et al. | 395/500 |

OTHER PUBLICATIONS

"Profibus DIN 19245T1=Physical+Data Link Layer DIN 19245T2=Application Layer" IEC Presentation 1.6–May 6, 1992 Frankfurt.
"FIP Network General Introduction" Sep. 10, 1990 CEGELEC.
Weaver et al. "Computer Communications for Factory Automation" 1993 (Jun.) IEEE pp. 413–418.
Kim et al. "The Performance of a Timer-Controlled Token Passing Mechanism with Finite Buffers in on Industrial Communications Network" IEEE Trans. on Industrial Electronics vol. 40 No. 4 (IEEE) Aug. 1993.
Simonot et al. "Reliability of Time-Critical Multicast Communications" 1990 IEEE pp. 517–521.
Weaver et al. "A Real Time Monitor for Token Ring Networks" 1989 IEEE pp. 794–798.

Primary Examiner—Hoa T. Nguyen
Assistant Examiner—Joseph E. Palys
Attorney, Agent, or Firm—Miller & Christenbury

[57] ABSTRACT

A method and apparatus for the monitoring, detecting and analyzing of signal errors on an electronic communications network, utilizing a communication signal on a fieldbus of the network, which includes receiving a communication signal from the communications network, and collecting information electronically on the components of each individual signal frame. This information is selected electronically by use of a software driven microcomputer. The communication signal is sent through an active real time filter array which actively passes selected individual frames. The filters are selected electronically by use of a software driven microcomputer. The filters may use context information present on the fieldbus in selecting frames. A software driven microcomputer is also used to display these individual frames in real time. Additionally, frames may be captured manually or automatically and stored electronically. Automatic capturing is accomplished by use of a trigger mechanism set by the microcomputer. A simulator may also be included for generating a simulated communication signal to be displayed simultaneously with the communication signal.

20 Claims, 10 Drawing Sheets

Microfiche Appendix Included
(7 Microfiche, 381 Pages)

| TIME FRAME | Messages<br>DST_ADDR SRC_ADDR<br>L.N.S   L.N.S |
|---|---|
| Time - 9875.921 Msg_len - 3 Msg 5 0 a | |
| Time - 9875.926 Msg_len - 20 Msg 4 6f 6f 6f de de de de c 71 71 71 71 71<br>71 71 71 71 71 71 71 0 | |
| Time - 9875.933 Msg_len - 1 Msg 4 0 | |
| Time - 9876.070 Msg_len - 3 Msg 3 0 14 | |
| Time - 9876.411 Msg_len - 3 Msg 3 0 a | |
| Time - 9876.415 Msg_len - 13 Msg 6 31 31 31 31 31 31 31 31 31 31 31 31 31<br>0 | |
| Time - 9876.421 Msg_len - 3 Msg 5 0 a | |
| Time - 9876.426 Msg_len - 20 Msg 4 6f 6f 6f de de de de c 71 71 71 71 71<br>71 71 71 71 71 71 71 0 | |

Figure 8

Messages

| TIME FRAME | ADDR (ID) | VALUE {ID LIST} | VALID |
|---|---|---|---|
| 466.275 ID_DAT | E02 | SHIP_STAR | YES |
| 466.298 RP_DAT_RQ1 | - | | |
| 466.320 ID_RQ1 | E02 | | |
| 466.345 RP_RQ1 | - | [105,205,305] | |
| 466.395 ID_DAT | 105 | | |
| 466.420 RP_DAT | - | 26.040 | NO |
| 466.450 ID_DAT | 205 | | |
| 466.482 RP_DAT | - | 13.288 | YES |

View OnLine Messages-PARSED, IDENTIFIER REQUEST

Figure 9

METHOD AND APPARATUS FOR MONITORING A COMMUNICATIONS NETWORK

FIELD OF THE INVENTION

The present invention relates to a method and apparatus for monitoring an electronic communications network, and more particularly, to a method and apparatus for detecting and analyzing the status of a communications network and the condition of component devices in the network through monitoring of signals present on the network.

BACKGROUND OF THE INVENTION

Many communication networks employed today, such as Ethernet Systems and other local area networks (or LAN's), consist of a series of field devices such as monitors, access terminals and other peripherals, which receive and transmit a variety of communication signals. In fieldbus systems, peripheral devices communicate with one or more main signal sources via a fieldbus line. Fieldbuses are a special type of LAN which can allow communication with a variety of sensors and activators or other peripherals. Each peripheral device is connected to this fieldbus line at various termination points. A general overview of one type of these systems is provided in FIG. 1. In general a fieldbus is used to monitor or control one or more pieces of production equipment.

Information is typically transmitted along the fieldbus in synchronized frames, which contain identifying information for the particular device sending the signal, such as the nature and length of the frame, and possibly a data or message segment. If the network is not operating properly, errors may be introduced into individual signal frames, or a group of related signal frames, which may cause damage to devices on the network or the loss of critical information. Errors may be introduced in a variety of ways. For example, noise may be introduced into the communication signal due to surrounding microwave or radio transmissions. Additionally, a mismatch in impedance between the termination point for particular devices and the fieldbus line may cause severe attenuation and delay in the transmission of the communication signal, causing an interference between two or more transmitted signals, or loss of the signal altogether. If a malfunction occurs in a signaling device, errors are introduced into individual frames or groups of related frames, which may cause the data to be received and stored incorrectly or not received at all. These signal errors may cause severe damage to or misoperation of equipment which is operated by the network, or the loss of crucial information. In addition, considerable time and effort may be expended in attempting to locate the cause of the error.

Previously, various inadequate system analyzers have been introduced to monitor fieldbus communication networks to detect communication errors. In these prior art systems, one or more message signals transmitted on the network are first stored electronically and then analyzed at a future time. This creates the severe disadvantage that errors may remain undetected for long periods of time, increasing both the actual or potential damage to, or misoperation of, the equipment operated by the network due to the faulty signal and, consequently, the cost of repair or replacement of damaged devices. Additionally, important transmitted data may be irretrievably lost due to the delay in detecting the malfunction. This creates the extreme disadvantage in the prior art that the communication network is not monitored accurately or efficiently, leading to increased cost of repair and increased potential damage or misoperation, since these prior art systems are not capable of detecting or displaying signal errors in real time.

Additionally, in previous fieldbus system analyzers, it has not been possible to monitor a communication signal while simultaneously generating a coordinated simulated signal from the analyzer with which to elicit a specific system response and make a real-time comparison in order to detect signal errors. In prior art systems, a simulated signal is produced separately and cannot be coordinated with a recorded communications signal. This creates a great delay in the detection and analyzation of communication errors and greatly increases the potential damage to or misoperation of the equipment operated by the communication network.

Because of the tremendous cost of modern manufacturing and the potential environmental and safety hazards that its misoperation may entail, a method and apparatus for monitoring and analyzing a communication network is needed which accurately and efficiently monitors the network, and quickly detects signaling errors. Additionally, a monitoring and detecting system is needed which combines a network analyzer with a simulator to more quickly and accurately detect signaling errors and thereby greatly reduce the cost of repair or replacement of network components and the cost and side effects of network misoperation.

OBJECTS OF THE INVENTION

It is, therefore, an object of the present invention to provide a method and apparatus for automatically, electronically monitoring and detecting signaling errors in a communication network.

Another object of the present invention is to quickly and efficiently monitor and analyze a communication network for malfunctions to minimize damage to the remaining system network.

It is a further object of the present invention to provide a method and apparatus for monitoring and analyzing an electrical communication network in real time to more quickly and efficiently detect signaling errors and minimize possible damage caused by the communication network.

Another object of the present invention is to provide a method and apparatus for monitoring a communication network, while simultaneously generating a simulated communication signal to detect errors in the received communication signal.

Further objects of the present invention will become apparent to those of ordinary skill in the art based on the disclosure of the invention herein and the appended claims.

SUMMARY OF THE INVENTION

The invention includes a method and apparatus for monitoring and analyzing a communication network to detect errors in signal transmissions. The method of the invention utilizes a communication signal within the communication network. This communication signal is detected within the communication network and characteristic information on one or more components of signal frames of the signal are identified. The communication signal is then actively filtered in real time to separate selected frames which are indicative of the operation of certain aspects of the communication network from the original signal frames. These frames may then be displayed in real time. The selected frames may also be captured in a capture buffer, stored electronically, and/or displayed in real time. Additionally, one or more simulated communication signals may be generated and displayed simultaneously with the original communication signal for exciting specific modes of operation and detecting signal errors or analyzing networks or peripheral operation.

The apparatus of the invention includes a probe which contains an electronic signal detector for detecting and parsing communication signals generated by one or more devices of the communication network, a characteristic information collector connected to the signal detector, an active real time filter array for separating selected frames of the communication signal, a memory of the address of the previous flame or flames, and a timer for synchronizing the probe with the detected frames. The apparatus also contains a user interface, connected to the probe, which includes a controller for the detection of communication signals, collection of information, selection of the criteria by which the probe selects frames, and for viewing the frames in real time. The invention may also include a triggered capturing device: for capturing a time sequence of frames, based on the characteristics of one of those frames, and storing those frames. The capturing device is controlled by the user interface and the probe. The invention may further include a simulator for generating a simulated communication signal to excite specific modes of operation of the network or of selected peripheral devices. The selected signal frames may also be displayed in a parsed real time manner to show the frame code and other identifying information. Signal frames may be captured manually or the trigger may be set to capture frames automatically when a certain event occurs. These frames may include both frames received before and after the triggering event.

BRIEF DESCRIPTION OF THE DRAWINGS

FIG. 8 is an illustration taken from a monitor screen of a typical HEX display in accordance with the present invention.

FIG. 9 is an illustration taken from a monitor screen of a typical parsed real time display in accordance with the present invention.

DESCRIPTION OF THE INVENTION

The present invention will be understood more fully from the detailed description given below and from the accompanying drawings of preferred embodiments of the invention which, however, should not be taken to limit the invention to a specific embodiment but are for explanation and understanding only.

Figure 1A:
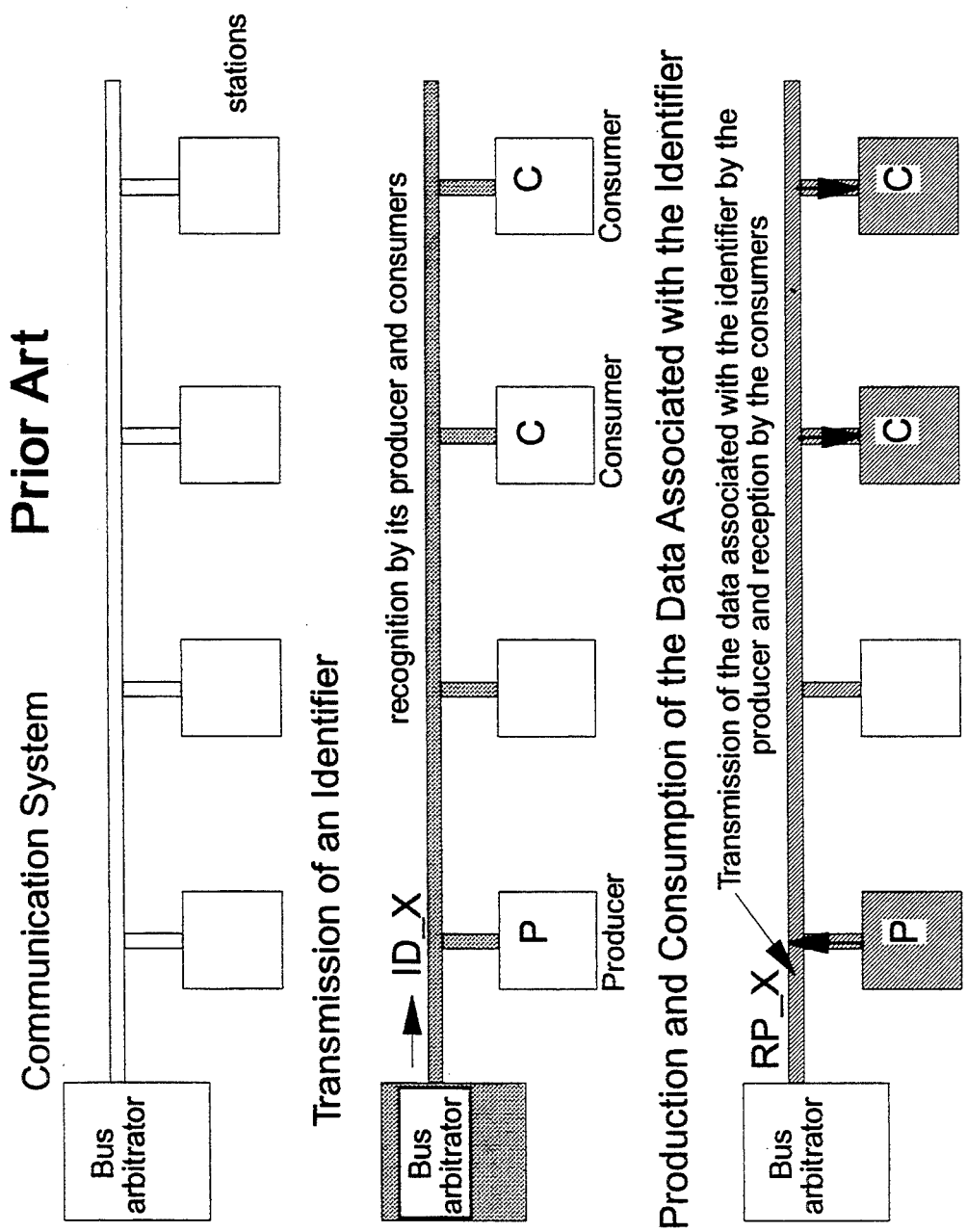
FIG. 1A is a schematic illustration of a type of a communication network.
Figure 1B:
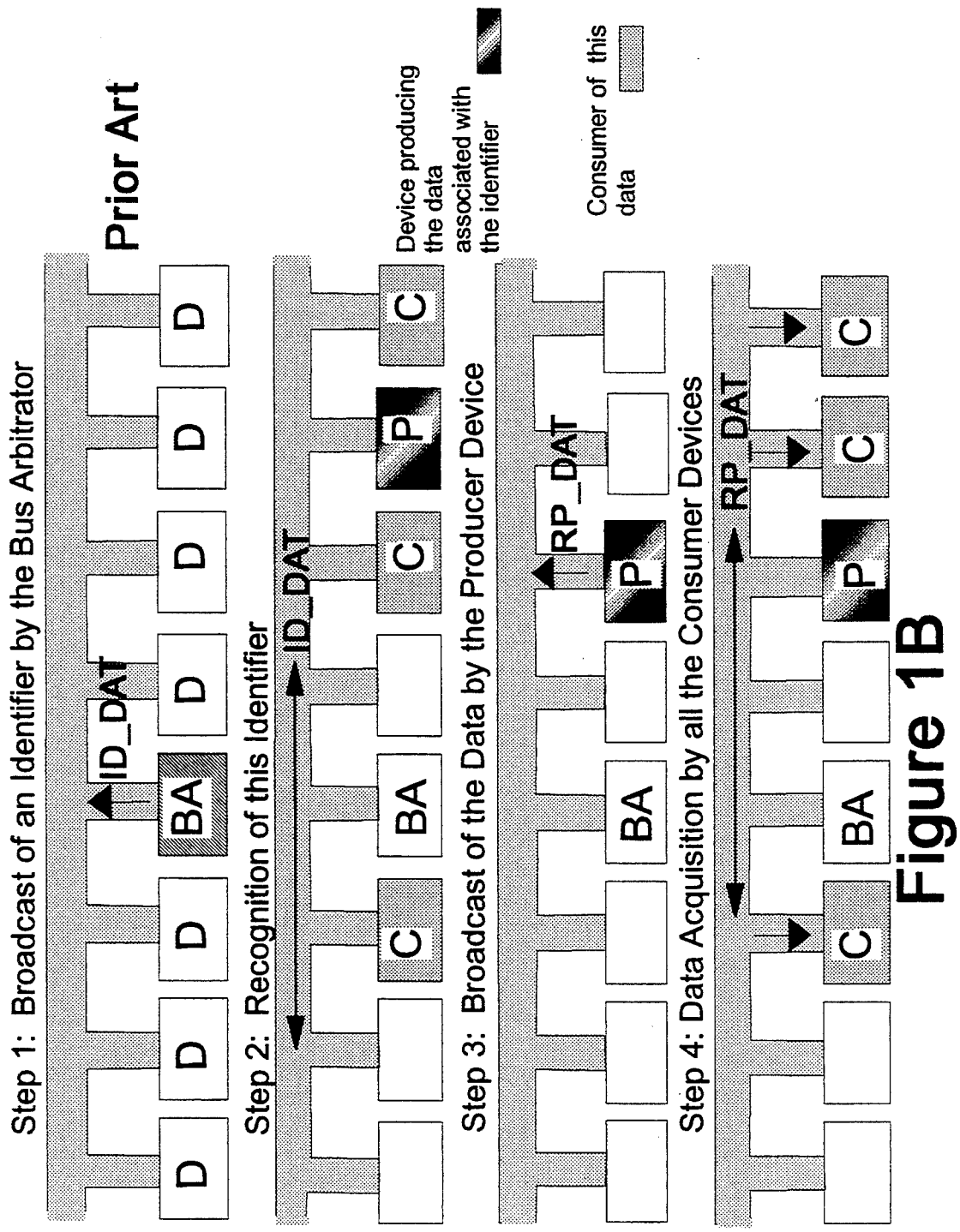
FIG. 1B is a schematic illustration of typical transmission configuration of one type of fieldbus communication network.

FIG. 1A shows a typical communication network and its components. FIG. 1B shows the typical transmission configurations of one type of a fieldbus communication network. The transmission of data along a communication system utilizing a fieldbus is also shown. From FIG. 7 it is seen that a context is maintained in the fieldbus between Identifier frames (IDDAT, IDMSG or IDRQ1/RQ2). This context allows omission of the associated address from the following reply frames (RPDAT, RPMSGNOACK, RPMSGCRRRQ1/RQ2). The apparatus of the invention is connected to such a network, as herein described, in order to monitor, detect and analyze all communication signals.

Figure 2:
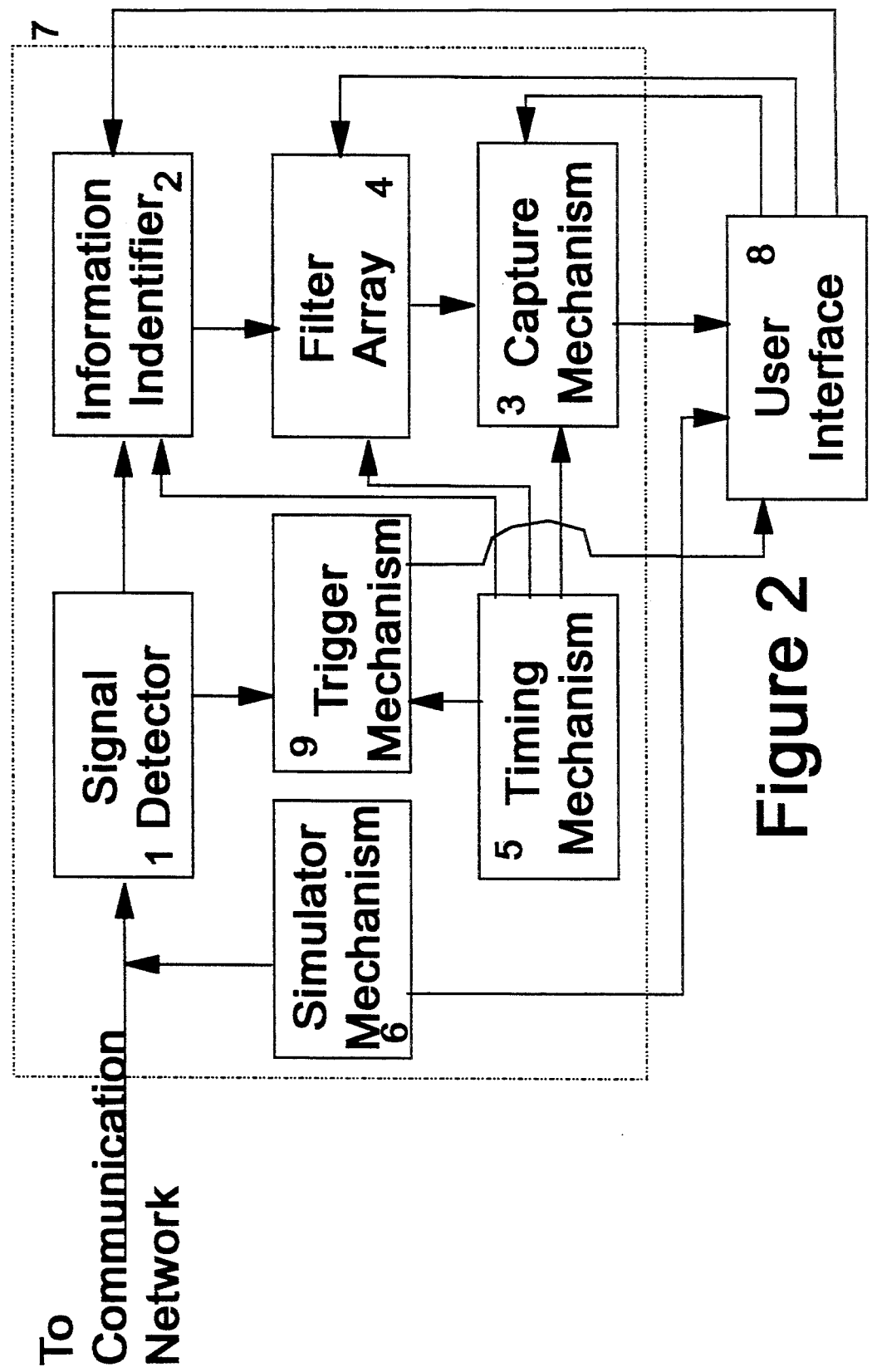
FIG. 2 is a block diagram of an embodiment of the communications network monitoring apparatus of the present invention.

FIG. 2 depicts a general block diagram of the present invention. Signal detector 1 receives a communication signal, such as an identifier frame, or a data or message frame, from a communication network, such as a fieldbus system, and passes the signal to an information identifier 2, which collects characteristic information on the incoming communication signal(s) and retains the context, address, or identifier (see FIG. 1B) between frames that establish context on the fieldbus. The information identifier 2 then sends this signal including the retained address or identifier to filter array 4 which passes the signal through a pre-selected filter. The signal then passes to capture mechanism 3, which captures the frames selected by filler array 4. The captured frames are then stored. The selected frames are also displayed at user interface 8. A timer 5 connects to information identifier 2, capture mechanism 3, filter array 4 and simulator 6 to synchronize the capture and transfer of the signal frames. Trigger mechanism 9 also receives the communication signal from signal detector 1. Simulator 6 can act to impress signals on the fieldbus network. User interface 8 controls all aspects of operation of the invention, such as receiving and capturing the frames, selection of the filters in filter array 4 or the information identified in information identifier 2. Signal detector 1, information identifier 2, filter array 4, capture mechanism 3, trigger mechanism 9, timing mechanism 5 and simulator 6 comprise probe 7.

Figure 3:
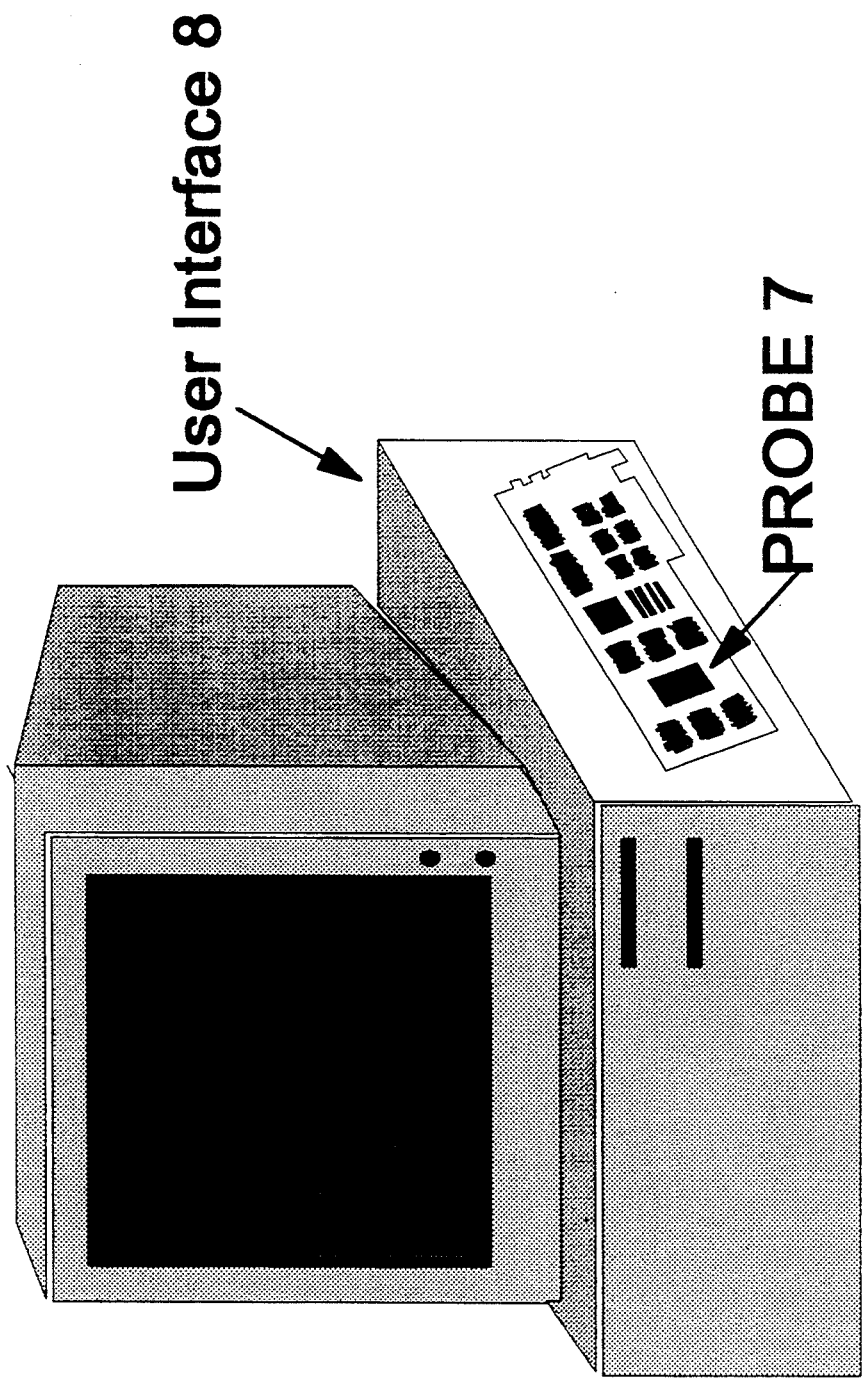
FIG. 3 is a schematic illustration of microcomputer apparatus that may be used in accordance with the present invention.
Figure 4:
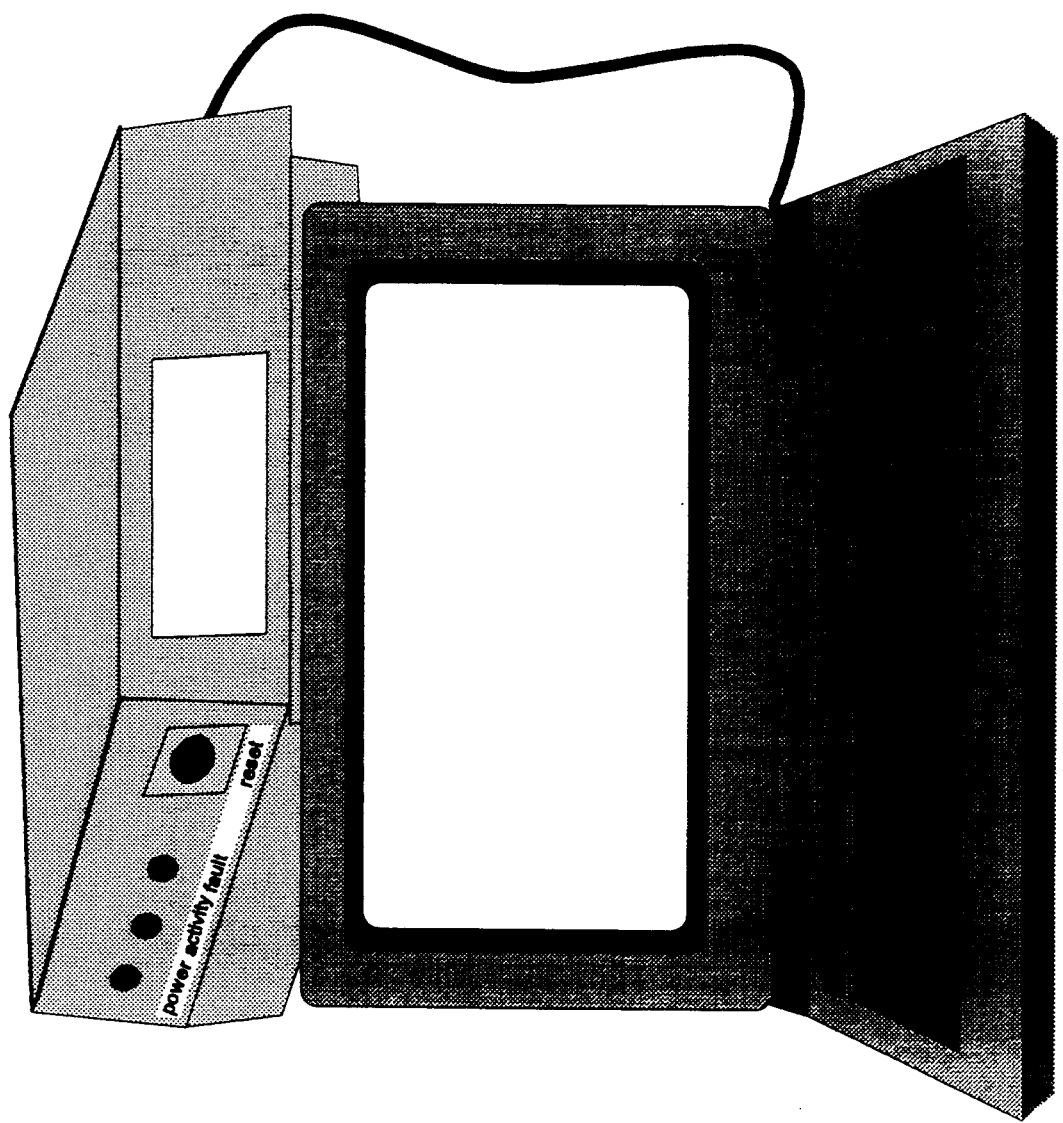
FIG. 4 is a schematic illustration of apparatus of the present invention connected to a laptop computer.
Figure 5:
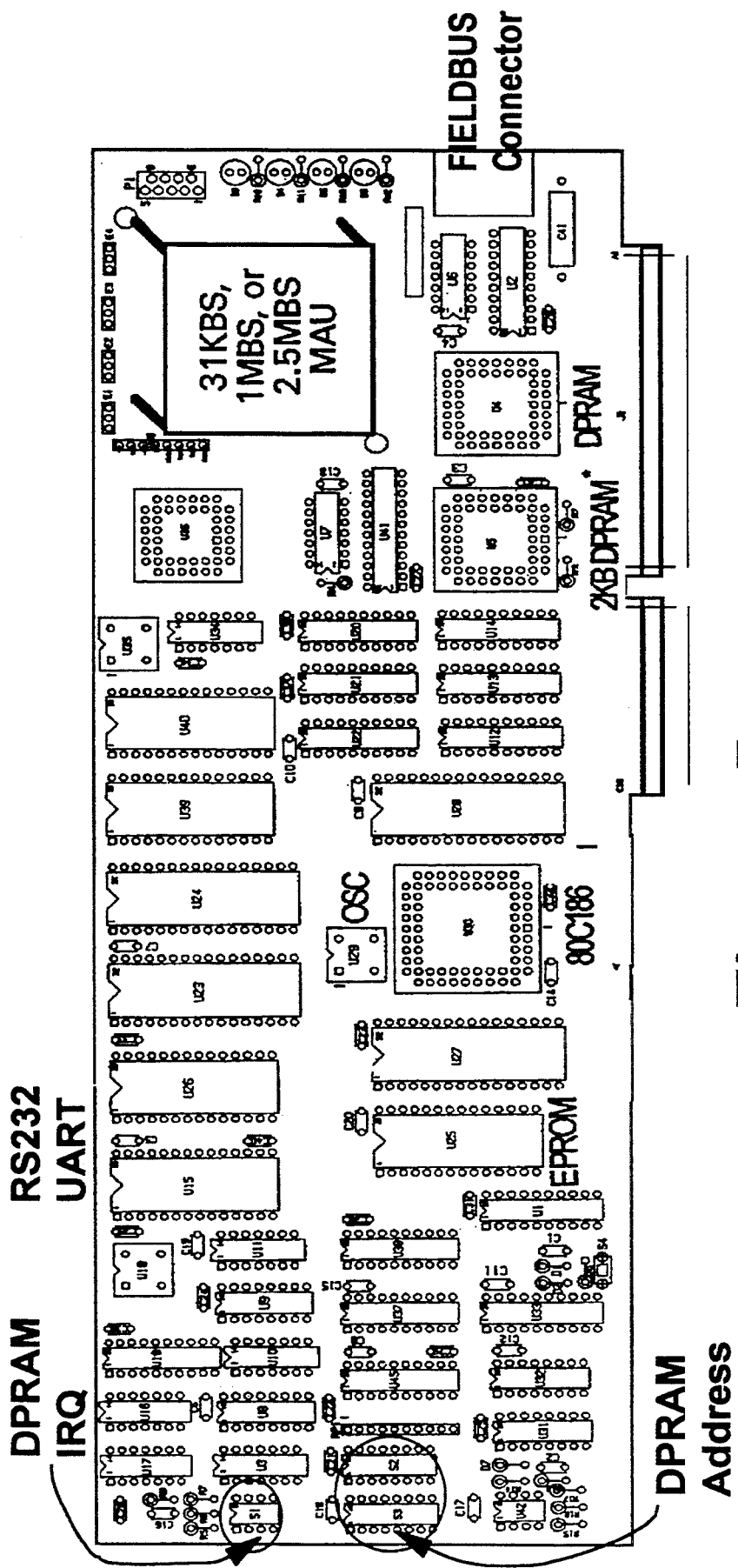
FIG. 5 is a schematic layout of an embodiment of a probe of the present invention.

FIGS. 3 and 4 show two preferred physical embodiments of the present invention. FIG. 3 shows probe 7 mounted within user interface 8. For example, user interface 8 may be a personal computer, and probe 7 may be an electronic circuit card inserted into this personal computer, which is driven by computer software, such as the computer program incorporated in the microfiche appendix. The computer program/software is produced by the assignee herein, Ship Star Associates, Inc. of Newark, Del. The operation manual for this software is hereby incorporated by reference into this disclosure. Alternatively, as in FIG. 4, probe 7 may be contained in a separate unit driven electronically by software contained in the personal computer of user interface 8. Probe 7 contains hardware and circuitry which performs the operations of the present invention in conjunction with user interface 8. For example, probe 7 may also contain conventional digital signal detection, decoding and active filtering circuitry, as well as conventional timing and signal buffer circuitry. An example of a typical embodiment of probe 7 is shown in FIG. 5.

Figure 6:
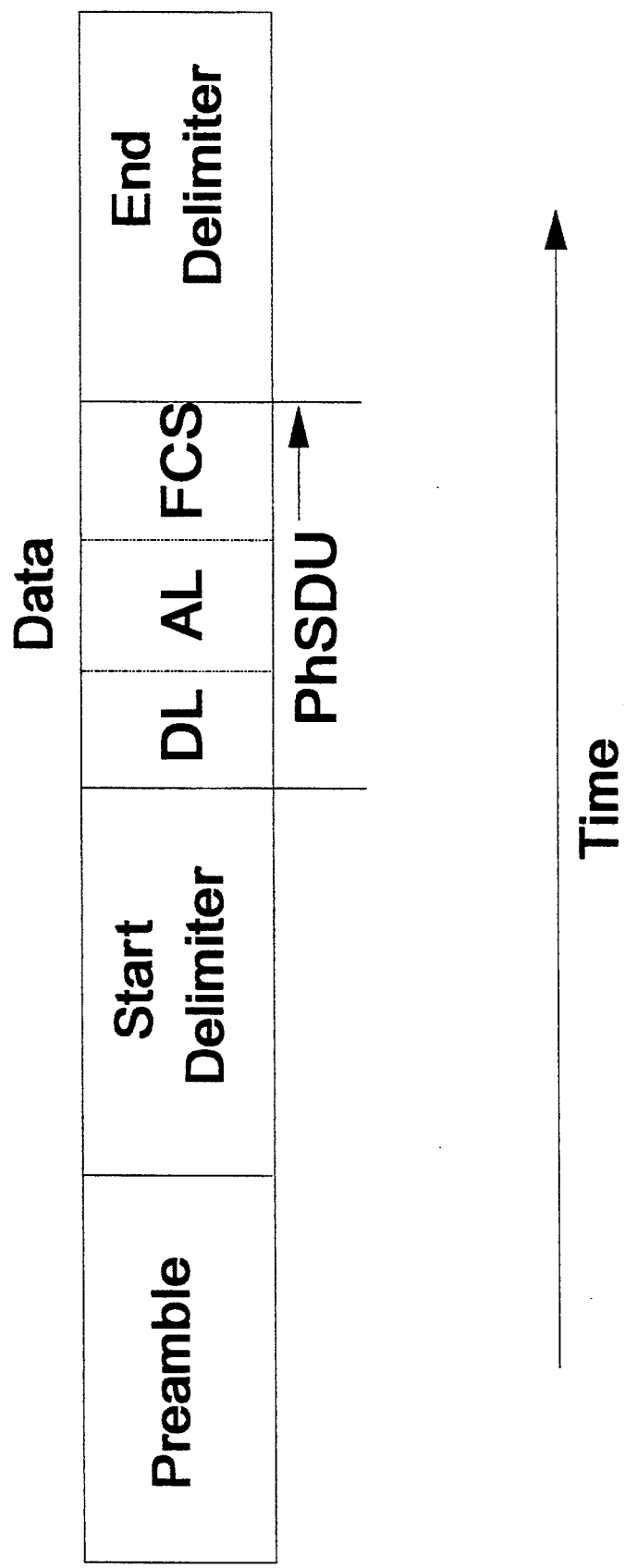
FIG. 6 is a schematic illustration of a typical frame used in a communication network.

The particular communication signal to be received by the present invention may vary depending on the particular network being monitored. A typical fieldbus network, for example, may use Manchester bi-phase L (Manchester II) encoding. A typical fieldbus frame for one type of such a network is shown in FIG. 6. These frames usually consists of a preamble, a start delimiter, a data or message segment, and an end delimiter. The data or message part of this signal is passed to user interface 8 by probe 7.

A variety of media may be used to transmit the communications signal to probe 7, such as twisted pair, and/or shielded wire, optical fibers or radio transmission. Typical operation speeds currently used in communication computer networks such as fieldbus LAN's, are 4800 Kb/s, 31.25 Kb/s, 1 Mb/s and 1.5 Mb/s, and 2.5 Mb/s. Of course, optical fiber and radio transmission rates may be much higher. Probe 7 may be constructed by using standard IC chips and field programmable gate array or application specific IOs, which detect the fieldbus signal and which are well known in the art as shown in FIG. 5.

Figure 7:
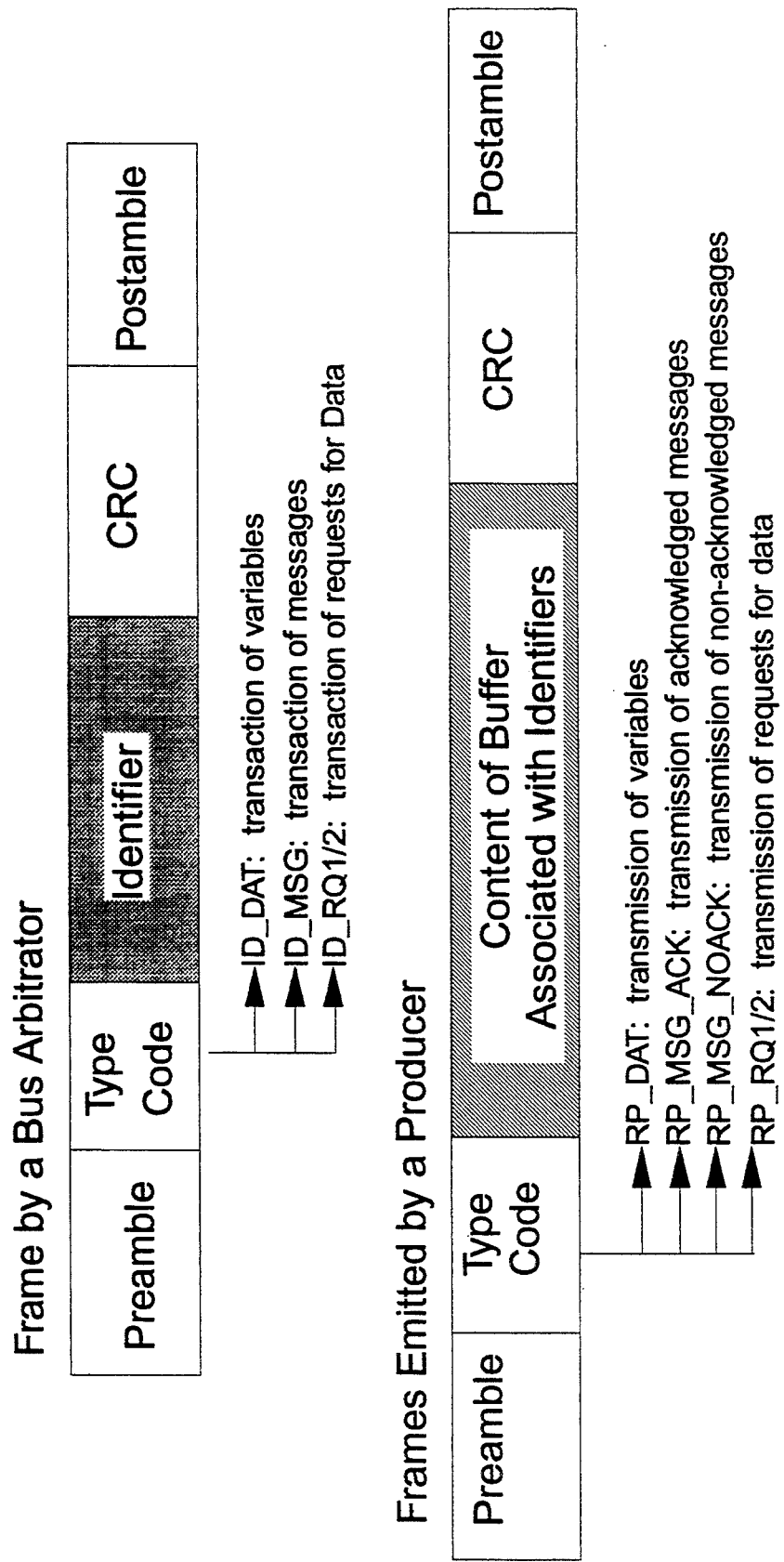
FIG. 7 is a schematic illustration of typical frame formats used in one type of a fieldbus communication network.

Typical frame formats which are often used by a fieldbus arbitrator or a remote device on a fieldbus LAN are shown in FIG. 7. FIG. 1 shows various data transfer configurations, commonly used in the art. The particular configuration used is noted by the type code portion of the signal frame, as noted in FIG. 7.

A typical operation of the present invention is as follows. Probe 7, which is attached to a communication network in a conventional manner, receives a signal from the network. After this signal is detected, characteristic information of the individual signal frames is then identified. Information identifier 2 may consist of conventional components used for identification of digital signal, such as a decoder and associated circuitry. This information may be stored by user interface 8 and may be displayed therein—for example, on the CRT of a personal computer, which may be software driven using software such as the program in this specification. Some of the possible characteristic information which can be identified by the present invention is listed and defined in Table 1, although additional information of various types originating from the various frames may be identified.

Table 1

1. Total received frames—the total count of valid frames received by probe 7.
2. Frames without end delimiter—the frames in which no end delimiter is detected following detection of a start delimiter.
3. Frames overrun to fieldbus interface—frames which are not received properly by probe 7 due to an inadequate inter-frame gap.
4. Malformed frames—frames which cause a hardware error within the signal decoder in probe 7. May be due to very high noise, very low signal, loose wiring or low fieldbus power supply at the defective device.
5. Frames with bad FCS (or CRC, Cyclic Redundancy Check) in error—frames where the FCS (frame check sequence) polynomial of the received frame does not agree with the relevant standard for a fieldbus. Random errors are due to very high noise or a very low signal power. Persistent FCS errors can indicate: (1) too many terminators installed, (2) polarity reversed, or (3) multiple frames transmitted at the same time due to a bus arbitrator stepping on a frame that is being transmitted by another node.
6. Calculated FCS (CRC) in error—the calculated FCS for the last frame with an FCS error.
7. Received FCS (CRC) in error—the FCS received in the last frame with an FCS error.
8. Frame overrun to user interface 8—frames which are received properly by the probe but could not be passed to user interface 8 due to filling up of all the buffers in the probe.

Computer software, such as that comprising the program disclosed in the microfiche appendix, may be used by user interface 8 to control the operation of the identifier circuitry in probe 7 and to control the identification of information and the collection of statistics from the received communication signal, as well as the storage and display of those statistics in user interface 8.

After these statistics are collected, the communication signal is then passed in standard fashion through active filter array 4 contained in probe 7. Active filter array 4 may consist of conventional active digital logic filters, which are commonly known in the art for detecting and selectively passing coded digital signal frames. These filters actively select the particular frames to be passed to user interface 8.

The selected frames may then be captured and stored or may be immediately displayed at user interface 8. Frames which are captured may be recorded in a capture buffer which is contained in capture mechanism 3 of probe 7. Capture mechanism 3 may be started and stopped by trigger mechanism 9. By having the capture buffer and trigger mechanism contained in probe 7, the present invention has the great benefit that significantly less frames are lost during capture, since there is substantially less delay than if the capture buffer were contained in user interface 8. The captured frames may be permanently stored, for example, on a computer disk in user interface 8. Also trigger mechanism 9 can be used to freeze the capture buffer when a selected number of frames have occurred after a specific event. This has the great advantage over the prior art of isolating the cause of an unusual event without requiring continuous human surveillance. The selection and activation of the filters in active filter array 4 is controlled by user interface 8, for example, by the use of software such as the program in this specification.

By first passing the selected signal frames to be recorded in capture mechanism 3 through active filter array 4, the present invention achieves the great benefit that it may isolate a general signal problem or a particular node, or the specific nature, cause and timing of a particular problem. The selection of frames by type or source greatly improves the diagnosis of a network problem. The present invention also provides the great benefit that this analysis may be done in real time by using real time filters, providing a great reduction in damage or misoperation caused by the network due to a system malfunction.

Each frame which passes through filter array 4 of probe 7 is written one at a time in the capture buffer which may also serve as temporary storage for messages to be displayed in real time by the user interface. The size of the capture buffer is not particularly limited but is preferably incremented in 1,024 byte allocations with preferably up to 64 buffers for a total of 65,536 bytes of memory allocated for the capture buffer. Setting of the trigger for manual of automatic capturing or real time display of signal frames may be controlled by user interface 8. During capture, user interface 8 also counts the number of received messages and undisplayed messages in the capture buffer. This provides the great benefit of increased quality control of the capturing process by tracking the number of received messages in relation to the number of messages which cannot be displayed due to possible limitations in the personal computer of user interface 8. The captured frames may be saved on a computer disk in user interface 8 in any number of formats commonly known to those of skill in the art, such as ASCII, HEX and the like. Examples are given in the displays shown in FIGS. 8 and 9. These saved frames can later be retrieved and edited at laser interface 8.

Initiation of signal frame capture may be done manually or automatically by user interface 8. The trigger of capturing mechanism 3 in probe 7 may be set by user interface 8 to record a number of frames upon the occurrence of a particular current or future triggering event. The trigger may be composed of conventional IC circuitry, well known in the art or by software such as that in the microfiche appendix. For example, detection of the triggering event may be accomplished by use of logic circuitry similar to that for active filter array 4 and for the identification of information. The parameters of the triggering event and the number of frames to be captured may be set by using interface 8 using, for example, a computer program such as that contained in this specification. Examples of possible triggering events are an incomplete frame, a frame overrun, a dead line (no activity for a set period of time) or an invalid FCS or CRC. By having the trigger in probe 7, the invention provides the great benefit that substantially no frames are lost, due to the great reduction in delay.

There are a number of possible active filter settings which may be grouped to allow the passage of selected frames to user interface 8. For example, filter array 4 may be set to allow passage of particular frames as identified by the type code as depicted in FIG. 7. Additionally, filter array 4 may be set to receive frames based on the destination and/or source address of a message frame which would replace the identifier portion of the frame format depicted in FIG. 7. This provides the great benefit that when user interface 8 is displaying message frames in real time, the source or destination of a particular frame may be identified quickly, greatly improving the identification of the cause of a system problem.

Filter array 4 may also pass selected frames based on variable identifiers or a synchronization message. Variable identifiers contained in the frame identify the contents of a particular shared data length buffer or variable. The use of a synchronization message filter can filter out the identifier frames which typical fieldbus arbitrators emit during idle periods. This substantially prevents any possible overloading of the real time display in user interface 8.

These filter settings may be executed in a number of different configurations. For example, the settings within a filter group may be applied separately to each frame, with the settings being configured as either an inclusive OR function or as an AND function. For example, if the filter settings are configured so that only IDDAT OR RPDAT, then all RPDAT and IDDAT frames will pass the frame control filter group. If the filter groups are set to pass RPDAT OR IDDAT identifier 2, then only RP DAT (which has the inferred identifier 2) and IDDAT frames produced on identifier 2 will be passed by filter array 4. Filter array 4 selects the RPDAT frame based on context (e.g., the identifier) remembered from the previous ID DAT frame.

Additionally, the settings within each filter group may be applied separately to each transaction (i.e. two or more related frames) of a particular type of frame. These may also be grouped as an inclusive, OR function or as an AND function. The selected frames are passed as above except that the groupings are applied separately to each transaction instead of each frame. This provides the great advantage that a continuous stream of frames of a particular type can be observed in real time at user interface 8 based on the filter settings. This greatly improves a user's ability to quickly detect and analyze signaling errors.

The selected signal frames, whether captured in the probe or not, may be viewed in real time on a display at user interface 8, such as a CRT of a personal computer. Real time filters may be used in filter array 4 to allow real time display of the selected signal frames. This provides a distinct advantage over prior art systems in which frames are only first recorded and then later analyzed after significant delay. The present invention provides the great benefit that the message signal may be viewed immediately in real time. Viewing the message signal in real time allows for a much quicker isolation of a general problem or damaged device and also the isolation of the nature, cause and timing of a specific problem.

The use of real time filters of filter array 4 of probe 7 allows the received frames to be viewed in real time at user interface 8. For example, user interface 8 may include a personal computer which is software driven. User interface 8 receives the message signal from probe 7 and displays it on a CRT. This display may include a count of the displayed messages since the last time the display was activated, as well as a count of messages that were sent from probe 7 but were not able to be displayed due to limitations in the personal computer of user interface 8. This provides greatly increased quality control of the real time display. The real time display will show information for each frame received by probe 7. For example, a typical display may include the time that the frame was received by probe 7; the frame code, destination address and source address for each identifier, or the frame code and data for each reply. Additionally, the display may show the time that the frame was received by probe 7, the message length from start delimiter to the start of FCS, or a message (in HEX format, for example). Typical examples of such a display are shown in FIG. 8 and FIG. 9.

The present invention may also include a simulator which can be used in combination with user interface 8 to greatly improve the detection and analysis of communication signaling problems. The simulator acts as a bus arbitrator, utilizing a electronically stored schedule for sending frames with identifying and variable characteristics. Signal messaging can also be simulated. The schedule is set by user interface 8, which is driven by software, such as the program in the microfiche appendix. The actual operation of the simulator of the present invention may be similar to the operation of comparable simulators which are well known in the art. The present invention provides the great benefit, however, that the simulator of the present invention is part of probe 7 and operated by user interface 8, allowing for quick and efficient analysis of potential communication signal errors on the fieldbus LAN. This is not possible in prior art systems which utilize a separate simulator.

The collection of statistical information, passing of selected frames and capturing of particular frames, is synchronized in the present invention by using timer mechanisms in probe 7. Timer mechanisms may be composed of standard IC chips which are commonly known in the art. The synchronization of individual frames to the various functions of the present invention is accomplished in a conventional manner by use of timing mechanisms.

Although this invention has been described with reference to particular embodiments, it will be appreciated that many variations may be resorted to without departing from the spirit and scope of this invention. For example, the statistical information collected by the present invention may include frame characteristics other than those disclosed herein, such as the run time of the probe's internal clock or the trigger type selected. Additionally, the user interface is not limited to a personal computer and may include any computing device which is capable of being program driven. Also, individual electronic components, such as timing mechanisms or capture buffer 3 may be located elsewhere than in probe 7, such as in user interface 8, or in a separate unit.

What is claimed is:

1. A method for monitoring, detecting and analyzing signals and errors on a fieldbus communication network, utilizing a communication signal on a fieldbus within said fieldbus communication network, comprising the steps of:
    receiving said communication signal from said fieldbus communication network;
    identifying characteristic fieldbus protocol information on one or more signal frames from said received communication signal being used on said fieldbus communication network;
    actively filtering said received communication signal in real time based on said identified characteristic fieldbus protocol information to separate frames indicative of errors in said fieldbus communication network or of operation or function of one or more fieldbus devices on said fieldbus communication network from among said signal frames.

2. The method of claim 1, further comprising the steps of triggering the capture of said frames, capturing said frames in a capture buffer, and storing said captured frames electronically.

3. The method of claim 2, wherein said flames are captured continuously in said capture buffer, contents of said capture buffer being frozen after a preselected number of flames have been captured.

4. The method of claim 1, wherein said active filtering step uses said characteristic fieldbus protocol information, concerning addresses or identifiers, contained in said frames to select said frames or deselect other related frames not concerning said addresses or identifiers.

5. The method of claim 1, further comprising the step of generating a simulated communication signal, and displaying said simulated communication signal simultaneously with said communication signal for causing and/or detecting signal errors or sequences of communication.

6. The method of claim 1, further comprising the step of filtering transactions of said selected frames separately.

7. The method of claim 1, further comprising the step of collecting statistics in real time on one or more of said signal frames, based upon said characteristic information.

8. The method of claim 1, wherein said selected individual frames are displayed in a parsed real time display.

9. The method of claim 1, further comprising the steps of triggering the capture of said frames, capturing said frames in a capture buffer, and displaying said captured frames.

10. The method of claim 1, further comprising the steps of triggering the capture of said frames, capturing said frames in a capture buffer, storing said captured frames electronically, and displaying said captured frames.

11. The method of claim 1, further comprising the step of displaying said separated frames in real time.

12. Apparatus for monitoring, detecting and analyzing signal errors on a fieldbus communication network, utilizing communication signals on a fieldbus within said fieldbus communication network comprising:
    a probe including (i) an electronic signal detector for detecting said communication signals which are generated by one or more devices of said fieldbus communication network, (ii) an information collector for collecting characteristic fieldbus protocol information connected to said electronic signal detector, (iii) an active real time filter array connected to said information collector for separating selected frames of said communication signal based on said characteristic fieldbus protocol information, and (iv) a timer for synchronizing said probe with said frames; and
    a user interface connected to said probe and including a communication signals detection controller, a controller for collection of said information, a controller for selection of said frames by said active real time filter array and a display for viewing said frames.

13. The apparatus of claim 12, further comprising a triggered capturing means for capturing said selected frames, based on the characteristics of said frames, and storing said frames, wherein said capturing means is controlled by said user interface and said probe.

14. The apparatus of claim 12, wherein said triggered capturing means is contained within said probe.

15. The apparatus of claim 13, wherein said frames are captured continuously in a capture buffer after capture begins and said trigger and capturing means freezes the captured frames of said buffer after a further selected number of frames have been collected.

16. The apparatus of claim 12, further comprising a simulator for generating a simulated communication signal, said simulated communication signal being displayed simultaneously with said communication signal for the detection of signal errors and operation of at least a portion of the network.

17. The apparatus of claim 12, wherein said selected individual frames are passed separately through said filter array based on each signal.

18. The apparatus of claim 12, wherein said user interface displays said frames in a parsed real time display.

19. A method for monitoring, detecting and analyzing signal errors on an electronic Fieldbus communications network, utilizing a communication signal on a fieldbus within said fieldbus communication network, comprising the steps of:

receiving said communication signal from said fieldbus communication network;

identifying characteristic fieldbus protocol information on one or more signal frames from said received communication signal being used on said fieldbus communication network;

actively filtering said received communication signal in real time, wherein said active filtering step uses said identified characteristic fieldbus protocol information, based upon addresses or identifiers contained or inferred in said signal frames, to select said signal frames or deselect other signal frames not containing or inferring said addresses or identifiers; and displaying said signal frames.

20. The method of claim 19, further comprising the steps of:

triggering the capture of said frames, capturing said frames in a capture buffer, and storing said captured frames electronically;

wherein said frames are captured continuously in said capture buffer, the contents of said capture buffer being frozen after a preselected number of frames have been captured, wherein said characteristic information is selected from the group consisting of total received frames, frames without end delimiter, frames overrun to fieldbus interface, malformed frames, frames with bad FCS or CRC, and wherein said selected frames are displayed in a parsed real time display; and generating a simulated communication signal, and displaying said simulated signal simultaneously with said communication signal for causing and/or detecting signal errors or sequences of communication.

* * * * *